United States Patent [19]

Walters

[11] 4,126,734
[45] Nov. 21, 1978

[54] BATTERY INSULATOR APPARATUS

[76] Inventor: Gary Walters, 134 Worman Ave., Southport, Ind. 46227

[21] Appl. No.: 816,021

[22] Filed: Jul. 15, 1977

[51] Int. Cl.² .......................................... H01M 10/50
[52] U.S. Cl. ..................................... 429/71; 429/120;
123/142.5 R; 180/68.5
[58] Field of Search .......................... 429/71, 120, 62;
123/142.5 R; 180/68.5

[56] References Cited
U.S. PATENT DOCUMENTS

| | | | |
|---|---|---|---|
| 2,104,766 | 1/1938 | Saunders | 180/68.5 |
| 2,104,772 | 1/1938 | Saunders | 180/68.5 |
| 2,133,577 | 10/1938 | Saunders | 180/68.5 |
| 2,435,277 | 2/1948 | Holthouse | 123/142.5 R |
| 2,717,045 | 9/1955 | Nallinger | 123/142.5 R |

Primary Examiner—Donald L. Walton

[57] ABSTRACT

Disclosed herein is a battery insulator apparatus which in the preferred embodiment comprises an insulating enclosure within which the battery is placed. The enclosure includes a pair of vents operable to open or close passageways leading from outside the enclosure to the interior of the enclosure. A vent includes a diaphragm and a compression spring positioned to normally move the diaphragm against an opening leading to the interior of the enclosure. The space behind the diaphragm is connected to a vacuum source, and application of a vacuum to the space causes the diaphragm to collapse against the spring, and thereby to move away from the opening to the interior of the enclosure. Alternative to the vacuum-operated vents, a shutter vent is mounted over an opening of the enclosure and is operable by air movement, such as that generated by the fan of an automobile engine, to open and permit air flow. When the vacuum-operated vents are connected to the vacuum system of an automobile engine, the vents are open when the engine is running, and are closed when the engine is not operating.

7 Claims, 9 Drawing Figures

BATTERY INSULATOR APPARATUS

BACKGROUND OF THE INVENTION

1. Field of the Invention

The present invention relates to an apparatus for insulating a battery, and more particularly to an apparatus which provides for air flow about the battery when the battery is being used but which confines the air to the area surrounding the battery when the battery is not in use.

2. Description of the Prior Art

In U.S. Pat. No. 3,837,918, issued to Nakabayashi on Sept. 24, 1974, there is disclosed a sodium sulfur storage battery which includes an air space surrounding the battery elements and pipes leading into and out of the air space. A temperature detector is utilized to control electromagnetic valves to maintain the battery at the constant temperature. The Nakabayashi patent is directed at a very special type of battery system which incorporates molten sulfur and sodium as the cathode and anode, respectively. The concern in the Nakabayashi device is to prevent the molten reactants, which are maintained at about 350° C., from damaging the containing vessel. A coolant is therefore piped through the space defined by the apparatus.

In U.S. Pat. No. 3,767,468, issued to Schusler on Oct. 23, 1973, there is described a battery apparatus which includes air cooling means. The battery container defines passages through which air is conducted to cool the battery. Related battery constructions are disclosed in U.S. Pat. Nos. 3,238,070, issued to Porter on Mar. 1, 1966; 2,666,091, issued to Martin et al. on Jan. 12, 1954; and, 2,410,952, issued to Lighton on Nov. 12, 1946. Each of these patents describes a battery construction which includes an insulating passageway surrounding the battery elements. In none of these patents, however, is there disclosed a battery insulating apparatus which includes vents operable to permit natural air flow about the battery while the battery is in use and which further retains the warm air around the battery when the battery is not in use. Further, none of the patents disclose vent means operable by an engine to which the battery is connected to permit air flow about the battery only when the engine is operating.

SUMMARY OF THE INVENTION

One embodiment of the present invention is an apparatus for maintaining a battery at a temperature above ambient temperature by retaining heat generated by the battery which comprises a container within which a battery is received, the container defining an interior space surrounding the battery, the container further defining at least one passageway communicating with the interior space and with the exterior of the container, and means for opening and closing each passageway defined by the container.

It is an object of the present invention to provide a battery insulating apparatus which will maintain the battery at a temperature above ambient temperature.

Another object of the present invention is to provide a battery insulating apparatus which will retain a portion of the heat generated by the battery in the area surrounding the battery.

A further object of the present invention is to provide a battery insulating apparatus which is simple and inexpensive in construction and operation.

It is another object of the present invention to provide a battery insulating apparatus which includes vents operable by the vacuum system of an engine to which the battery is connected.

A further object of the present invention is to provide a battery insulating apparatus which includes vents which are operable to permit air flow about the battery when the battery is in use, and which are operable to prevent air flow about the battery when the battery is not in use.

Another object of the present invention is to provide a battery insulating apparatus which may be separate from the battery, or which may be constructed integral with the battery elements.

It is a particular object of the present invention to provide a battery insulating apparatus which is adapted for use with truck or automobile batteries and which may be connected to the vacuum system of the engine of the truck or automobile to permit air flow about the battery only when the engine is operating.

It is a further object of the present invention to provide a battery insulating apparatus which will maintain the battery at a temperature above ambient temperature, and which will thereby prolong the life of the battery by reducing the amount of charging required for the battery.

Further objects and advantages of the present invention will become apparent from the description of the preferred embodiments which follows.

DESCRIPTION OF THE PREFERRED EMBODIMENTS

Figure 1:
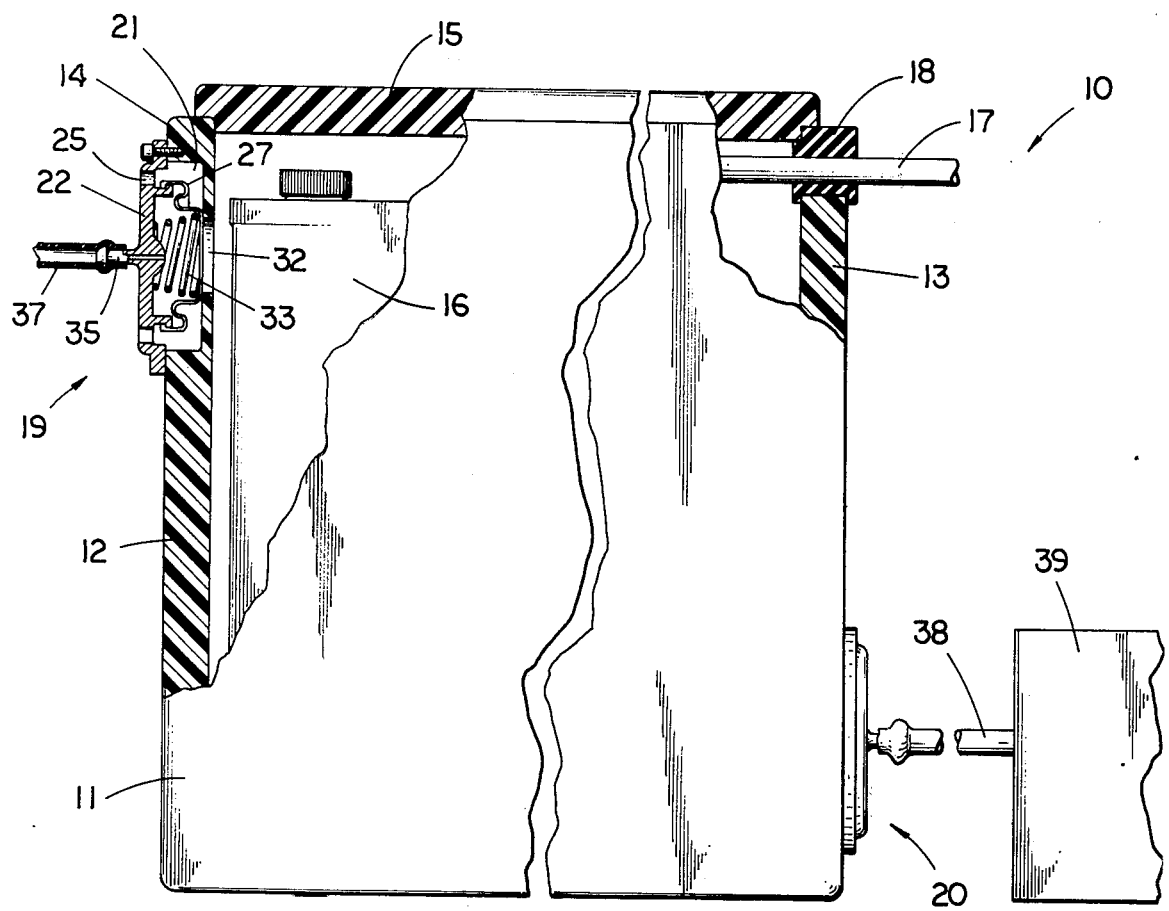
FIG. 1 is a side, elevational view of the battery insulating apparatus of the present invention, with portions broken away to show the details thereof.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides an apparatus for retaining the heat generated by a battery in the proximity of the battery to improve the battery efficiency, particularly during cold ambient temperatures. Referring in particular to FIGS. 1-4, there is shown a first embodiment of the present invention. The present invention comprises a container 10 having a casing 11 comprising side walls 12 and 13, and a lid 15. A battery 16 is received within container 10. Battery 16 sets within casing 11 between side walls 12 and 13, and the lid 15 rests upon the upper run 14 of the casing 11.

Appropriately located in the side walls of casing 11 are cable seals, such as 18, through which battery cables, such as 17, extend. As shown, the cable seals are preferably located at the top edge of the side walls, such as 13, to facilitate placement of the appropriate battery cables therein. Cable seals, such as 18, seal and thereby insulate the area surrounding the battery cables to eliminate a possible loss of heat energy from container 10.

Appropriately located in the side walls 12 and 13 are closures, such as 19 and 20. There are preferably at least two closures, one being located on a side opposite the other. Also, one is preferably located near the bottom of casing 11, as is closure 20, and the other is located near the top of casing 11, as is closure 19. The closure members operate to open or close ports which connect from the interior of container 10 to the exterior thereof. Various methods for actuating the opening and closing of the described ports are contemplated, and variations of those shown in the figures are intended to be covered hereby. A most preferred method for actuating the closure members is to connect the closures through tubes, such as 37 and 38, to a vacuum source 39. In a typical application of the present invention, the vacuum source would be the automobile engine to which the battery is connected.

Closures 19 and 20 are identical, and therefore only closure 19 will be described in detail. Closure 19 comprises a member 22 which is preferably circular in general shape and has a circular, peripheral flange 23 integral therewith. Side wall 12 of casing 11 includes a circular recess 21 having a diameter less than the outside diameter of peripheral flange 23 of member 22. Flange 23 thereby is positionable against side wall 12 to surround recess 21, and screws 24 connect member 22 through flange 23 to sidewall 12.

Side wall 12 includes a circular aperture 32 communicating with wall recess 21 and the interior of container 10. A diaphragm 27 is connected to member 22 and is operable to open and close circular hole 32. Member 22 has a cylindrical flange 26 having a lip 28 which extends radially-outwardly therefrom. Diaphragm 27 includes a lip portion 29 which extends radially-inwardly from the diaphragm 27. Diaphragm 27 is sealingly connected to cylindrical flange 26 of member 22 by engagement of lip 28 by lip portion 29. A sealed attachment of the diaphragm 27 to member 22 may be accomplished in various ways. It is preferred that the lip portion 29 of diaphragm 27 be glued or frictionally secured to circular flange 26 to provide the sealing engagement.

Figure 2:
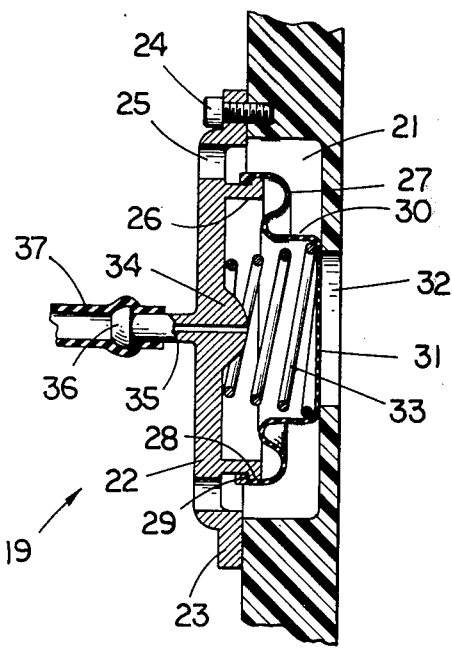
FIG. 2 is a side, cross-sectional view of a vacuum-operated vent constructed in accordance with the present invention, the vent including a diaphragm shown in the expanded condition.

Diaphragm 27 includes a cylindrical portion 30 and a circular portion 31 integral at one end of cylindrical portion 30. Circular portion 31 has a diameter greater than the diameter of circular aperture 32 to permit circular portion 31 to be positioned against the portion of wall recessed 21 which defines and extends about circular aperture 32. Means are provided for urging cylindrical portion 30 to extend as shown in FIG. 2, and to thereby cause circular portion 31 of diaphragm 27 to rest against and close circular aperture 32.

Figure 3:
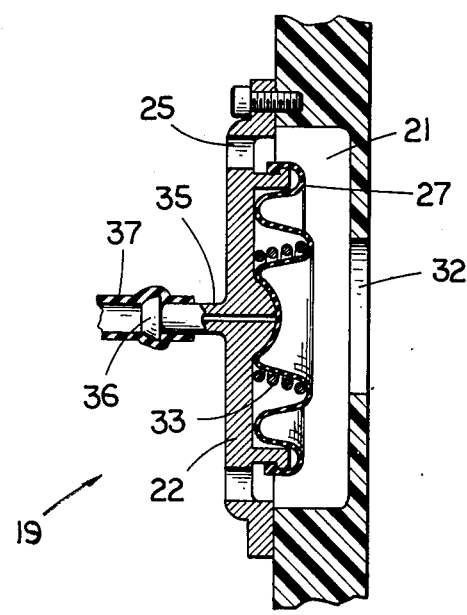
FIG. 3 is a side, cross-sectional view of a vacuum-operated vent constructed in accordance with the present invention, the vent including a diaphragm shown in the collapsed condition.
Figure 4:
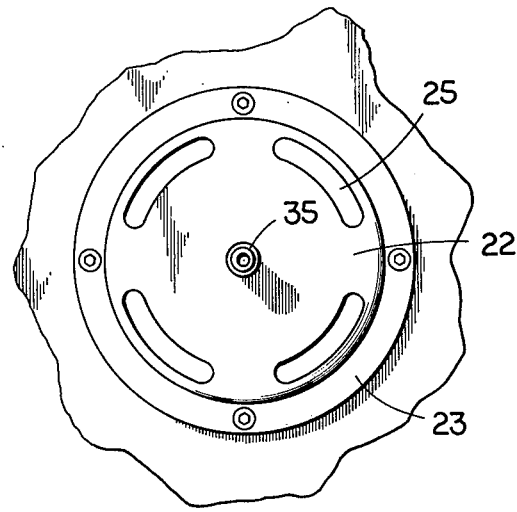
FIG. 4 is a front, plan view of the vent of FIG. 1.

Preferably a compression spring 33 is positioned within the space between diaphragm 27 and member 22. Member 22 includes a raised portion 34 against which one end of spring 33 seats. The other end of spring 33 is sized to fit within cylindrical portion 30 of diaphragm 27 and to rest adjacent circular portion 31. Spring 33 normally urges diaphragm 27 to expand to cause circular portion 31 to close aperture 32 (FIG. 2). Means are provided for compressing spring 33, as shown in FIG. 3, to retract circular portion 31 from aperture 32, and thus to open aperture 32.

Preferably spring 33 is compressible by the operation of a vacuum system operable to collapse diaphragm 27 against member 22. Member 22 inludes a tubular extension 35 which includes an enlarged head portion 36, tubular extension 35 including a central aperture extending into communication with the space between member 22 and diaphragm 27. Tubular extension 35 is connected, such as by tubular hose 37, to a vacuum source. It is contemplated that in a typical application of the present invention the vacuum source would comprise an automobile engine to which the battery enclosed by container 10 is connected. Application of a vacuum on the space between diaphragm 27 and member 22 causes diaphragm 27 to collapse against member 22. Spring 33 is selected to permit the vacuum source 39 to collapse diaphragm 27 against spring 33 upon application of a vacuum as described.

Member 22 includes a plurality of apertures 25 extending therethrough and coupling the exterior of member 22 with wall recess 21. Air is thereby permitted to pass from wall recess 21 through apertures 25 to the exterior of closure 19. As is apparent from FIGS. 2 and 3, the presence of apertures 25 and the extension or retraction of diaphragm 27 permits the passage of air from outside container 10 to the inside of container 10 to be controlled. With diaphragm 27 extended to have circular portion 31 closing aperture 32, air exterior of container 10 is prevented from passing to the interior of container 10 and similarly air within container 10 is prevented from escaping therefrom. With diaphragm 27 collapsed, as shown in FIG. 3, the free exchange of air between the interior of container 10 and the exterior is permitted. In this manner, the present invention enables the heat energy generated by operation of the battery to be retained in the vicinity of the battery. When the battery source is being used, heat is generated within the battery, and in the absence of the present invention would normally escape into the surroundings. In use, the present invention has the diaphragm collapsed while the battery is in use to permit excessive heat to escape from the area of the battery. However, when the battery is not in use, diaphragm 27 is caused to extend and to prevent the escape of air from the area of the battery.

Figure 6:
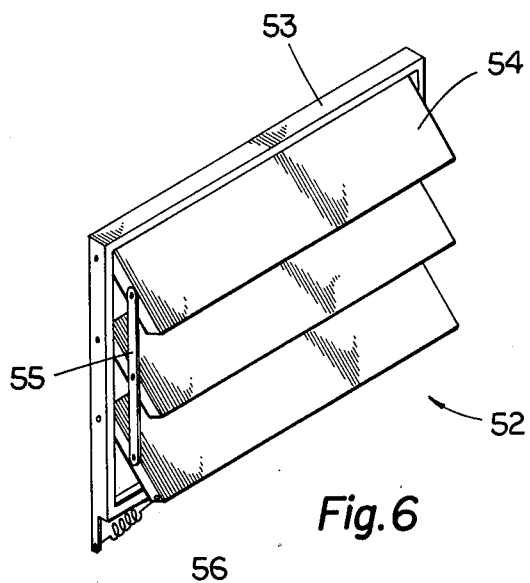
FIG. 6 is a perspective view of an alternate embodiment of a vent useful in accordance with the present invention.
Figure 7:
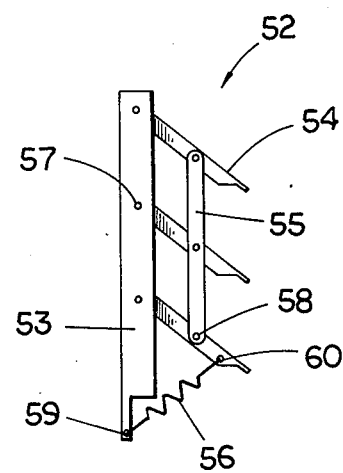
FIG. 7 is a side view of the vent of FIG. 6.

Referring in particular to FIGS. 6 and 7, there is shown an alternate embodiment of a closure useful in accordance with the present invention. Closure 52 comprises a shutter apparatus including a peripheral frame 53 and shutters, such as 54, pivotally mounted to frame 53 by pivot pins, such as 57. The shutters are interconnected by a bar 55 connected to each of the shutters by pivot pins, such as 58. The attachment of bar 55 to shutters, such as 54, insures that movement of one of the shutters will result in corresponding movement of all of the shutters. Frame 53 includes an arm extension 59 (FIG. 7). Tension spring 56 is connected at one end to arm 59, and at the other end to shutter 60. Spring 56 normally urges shutter 60, and therefore all of the shutters, to the closed position. Means are also provided for urging the vents to the open position to permit air flow therethrough.

In a particular application, closure 52 is mounted to a container in a similar fashion to the mounting of closures 19 and 20 on the container 10 (FIG. 1). Closure 52 is, for example, used on a container associated with a truck or automobile engine, and the force of the air moved by the engine fan will open closure 52 when the engine is running, but otherwise will permit closure 52 to be closed by the operation of spring 56. The opening of closure 52 results from the air blown by the engine fan by positioning closure 52 on the container such that the air blown by the engine fan is directed across closure 52 in a direction to cause the expansion of spring 56. This may be accomplished, for example, by mounting closure 52 on the battery container such that the individual shutters are positioned vertically and spring 56 is positioned on the side nearest the engine fan. The force of the air blown by the engine fan will thereby force the vents to the open position against the resistance of spring 56.

Figure 5:
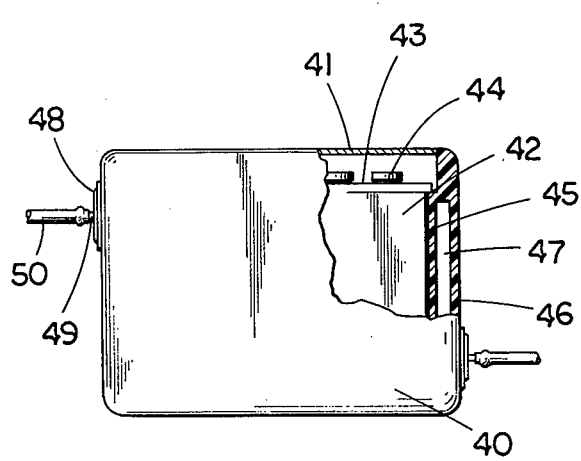
FIG. 5 is a side, elevational view of an alternate embodiment of the present invention, a portion being broken away to reveal the details thereof.
Figure 8:
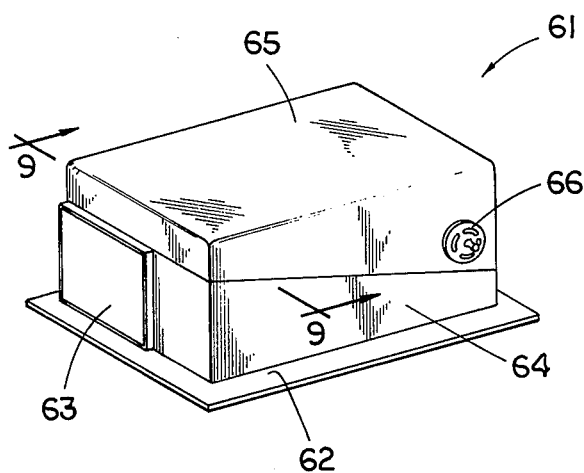
FIG. 8 is a perspective view of a second alternate embodiment of the battery insulating apparatus of the present invention.
Figure 9:
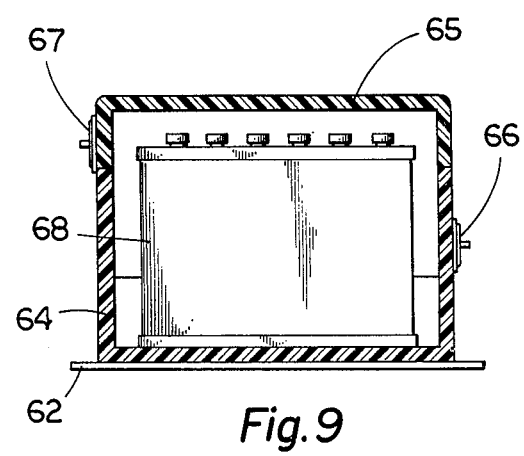
FIG. 9 is a side, cross-sectional view of the apparatus of FIG. 8.

In FIGS. 5, 8 and 9 there are shown alternate embodiments of the battery insulating apparatus of the present invention. In FIG. 5 there is shown an apparatus 51 which comprises a container 40 having a battery portion 42 integral therewith. Container 40 has a sealed lid 41 which is spaced above top 43 of battery portion 42, and which is thereby positioned above the battery caps, such as 44. Lid 41 is normally sealed with container 40, but is removable to permit servicing of the battery if necessary. Container 40 includes side walls 45 and 46, which define an air space 47 therebetween. Closures, such as 48, are mounted to container 40 and communicate with air space 47. Closure 48 includes a tube portion 49 to which a hose 50 is connected, hose 50 leading to a vacuum source as previously described with respect to the embodiment of FIG. 1. As previously described, operation of the closures, such as 48, control the movement of air through the air space 47, and thereby control the temperature of battery portion 42.

A second alternate embodiment of the battery insulating apparatus of the present invention is depicted in FIGS. 8 and 9. For certain trucks or other automobiles, for example, the engine battery 68 is normally positioned upon a platform 62. Battery insulating apparatus 61 is then incorporated with the existing structure of the truck or automobile. A frame 63, partially shown in FIG. 8, is positioned about platform 62 and bottom portion 64 of apparatus 61 is formed upon platform 62. Bottom 64 is formed as by injection molding within frame 63, in accordance with methods well known in the art. Closures 66 and 67 are mounted, as previously described with respect to FIG. 1, to top portion 65 of apparatus 61. Top portion 65 is formed to fit upon bottom portion 64, and thus to combine with bottom portion 64 to form an enclosure surrounding battery 68.

The battery insulating apparatus of the present invention provides several advantages. The apparatus has a particular application to the automotive field to maintain the battery at a temperature above ambient temperatures. In doing so, the apparatus prolongs the life of the charging and starting systems, and particularly the battery, alternator and starter, by reducing the amount of charging necessary to maintain the battery voltage. By maintaining the battery at a warmer temperature, the efficiency of the battery is increased. Further incidental advantages of the present invention include the operation of the insulating apparatus as a shock absorber, and as a housing to protect the terminals and other portions surrounding the battery from leakage from the battery.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus for maintaining a battery at a temperature above ambient temperature by retaining heat generated by the battery which comprises:
   a container within which a battery is received, the container defining an interior space surrounding the battery, said container further defining a passageway communicating with the interior space and with the exterior of said container; and
   a closure device mounted to said container and associated with the passageway, said closure device having a first condition in which the passageway is closed by said closure device and a second condition in which the passageway is open, said closure device being connectable to a vacuum source and being operable by the vacuum source to change between the first and second conditions, said closure device normally being in one of said first and second conditions and being moved to and maintained in the other of said first and second conditions during application of a vacuum by the vacuum source said closure device comprising a diaphragm having a first position in which the passageway is closed and a second position in which the passageway is open.

2. The apparatus of claim 1 in which the diaphragm is flexible, the diaphragm in the first position being expanded to close the passageway, the diaphragm in the second position being collapsed to open the passageway.

3. The apparatus of claim 2 in which said closure device further includes a compression spring positioned to normally expand the diaphragm to close the passageway, said closure device further including means for compressing the spring to collapse the diaphragm and to open the passageway.

4. The apparatus of claim 3 in which the means for compressing the spring comprises a member connected to said container, the diaphragm being sealingly connected to the member and defining a space therebetween, the spring being positioned within the space defined by the member and the diaphragm, the means for compressing the spring further including means for providing communication between the space defined by the member and the diaphragm with a vacuum source for providing a vacuum within the space to collapse the diaphragm against the member and to thereby open the passageway.

5. The apparatus of claim 2 in which said closure device further includes a member connected to said container, the diaphragm being sealingly conneced to the member and defining a space therebetween, said closure device further including means for drawing a vacuum within the space defined by the member and the diaphragm to collapse the diaphragm against the member and to thereby open the passageway.

6. The apparatus of claim 5 and further including a battery positioned within said container.

7. The apparatus of claim 1 and further including a battery positioned within said container.